(12) United States Patent
Attard

(10) Patent No.: US 8,029,073 B2
(45) Date of Patent: Oct. 4, 2011

(54) MOTOR VEHICLE RAPID BRAKING BRAKE BOOSTER

(75) Inventor: Jean-Marc Attard, Villers Sous St Leu (FR)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 12/265,845

(22) Filed: Nov. 6, 2008

(65) Prior Publication Data
US 2009/0115245 A1 May 7, 2009

(30) Foreign Application Priority Data
Nov. 6, 2007 (FR) ..................... 07 07810

(51) Int. Cl.
*B60T 8/44* (2006.01)
(52) U.S. Cl. ............... 303/114.3; 303/113.3; 91/376 R
(58) Field of Classification Search ............. 303/114.3, 303/113.3, 114.1, 114.2; 91/376 R, 369.1–369.4
See application file for complete search history.

(56) References Cited

U.S. PATENT DOCUMENTS

| 6,564,692 | B2 * | 5/2003 | Inoue et al. | .................. 91/369.3 |
| 7,089,846 | B2 * | 8/2006 | Tsubouchi et al. | .......... 91/369.2 |
| 7,201,456 | B2 | 4/2007 | Bacardit et al. | |
| 7,267,040 | B2 | 9/2007 | Attard et al. | |
| 7,685,926 | B2 * | 3/2010 | Mori | ........................... 91/376 R |

FOREIGN PATENT DOCUMENTS
FR 2782044 2/2000

OTHER PUBLICATIONS
FR 0707810 Search Report and Written Opinion.

* cited by examiner

*Primary Examiner* — Pamela Rodriguez
(74) *Attorney, Agent, or Firm* — Michael Best & Friedrich LLP

(57) ABSTRACT

The invention relates to a brake booster with a short operating travel, in which the three-way valve comprises a mobile valve seat borne by a sleeve (54). The movement of this sleeve is controlled by the piston. According to the invention, there is an elastic device (70) applying force to the sleeve (54) in the direction of the front of the booster, and tending to move this sleeve forward with respect to the pneumatic piston (12). In addition, there is a device for transmitting the pressure of the master cylinder (120) to the sleeve (54) and that tends to apply a rearward force to the sleeve (54).

20 Claims, 5 Drawing Sheets

MOTOR VEHICLE RAPID BRAKING BRAKE BOOSTER

BACKGROUND AND SUMMARY OF THE INVENTION

The invention relates to a brake booster and more specifically to a rapid actuation brake booster that can be applied in particular to motor vehicles.

In automotive braking systems, there is generally a perceptible dead travel at the start of braking when the brake pedal is actuated and during which the driver depresses the brake pedal without any hydraulic pressure being induced effectively in the vehicle braking circuit.

There are systems in existence that are able to reduce this dead travel. Such is the case, for example, of the system described in French Patent Application FR 2 856 363.

This system comprises, as depicted in FIGS. 1 and 2:

- a casing 2, of longitudinal axis X, containing a skirt 6 mounted such that it can slide axially in a sealed manner in the casing and which delimits a low-pressure first chamber 8 known as the front chamber and a variable-pressure second chamber 10 known as the rear chamber,
- a piston 12 secured to the skirt 6,
- a three-way valve 26 which, under the control of a control rod 28, can be used to isolate the front and rear chambers from one another, to place them in communication with one another, or to place the rear chamber at a higher pressure with respect to the low pressure such as atmospheric pressure,
- a sleeve 54 sliding axially inside the piston 12, an annular face 48 of this sleeve acting as a first valve seat, known as the equalizing seat, for the three-way valve 26,
- a slide valve plunger 32 that has an annular face 50 acting as a second valve seat, known as the intake valve seat, for the three-way valve 26,
- a key 84 running at right angles to the axis X through two diametrically opposed openings 86 in the piston and two diametrically opposed slots 88 in the sleeve 54. The key 84 is mounted fixedly in the pneumatic piston 12.

The way in which a booster such as this works is as follows:

In the rest position (FIGS. 1 and 2), the valve shutter 46 is lifted off the first valve seat or equalizing seat 48 (borne by the sleeve 54) and places the front chamber 8 in communication with the rear chamber 10. The valve shutter 46 presses against the intake valve second seat 50 thus isolating the rear chamber from atmospheric pressure.

At the start of a braking phase, when the driver depresses the brake pedal, the control rod 28 is moved axially forward, the valve shutter 46 then comes to press against the first valve seat 48, isolating the rear chamber from the front chamber, and lifts off the second seat 50 and allows air at atmospheric pressure to be supplied to the rear chamber. Because of the pressure difference between the front chamber and the rear chamber, the skirt 6 and the piston 12 are made to move forward. The first valve seat 48 borne by the sleeve 54 is immobile while the clearance C between the key 84 and the front end of the second slots 88 is not closed up.

The spring 58 keeps the sleeve 54 in a determined axial position relative to the casing of the booster as long as the piston 12 has not covered a determined travel C (FIG. 2). The hydraulic piston of the master cylinder is pushed by the pneumatic piston, which itself carries along the auxiliary piston 126 which moves away from the sensor feeler. Once the pressure in the master cylinder is high enough for the auxiliary piston 126 to be able to overcome the jump spring 128, the auxiliary piston is pushed back toward the sensor feeler until it comes into contact therewith and then passes the reaction on from the hydraulic circuit to the brake pedal.

When the pneumatic piston 12 has covered the travel C (see FIG. 2), the front face 100 of the key 84 which is fixed relative to the pneumatic piston comes to bear against the front end of the slots 88 of the sleeve. The sleeve is then axially connected with the movement of the piston. The valve shutter 46 comes into contact with the intake valve seat 50 and interrupts the supply of air at atmospheric pressure to the rear chamber. The driver then has to depress the brake pedal further in order to increase the intensity of braking.

The travel C is preferably chosen such that it corresponds to the dead travel of the master cylinder, that is to say to the travel that the hydraulic piston has to cover within the master cylinder in order to begin to cause the pressure of the brake fluid to rise in the brakes. As a result, the driver feels through the pedal only the travel needed to close the equalizing valve and open the intake valve and does not perceive the dead travel of the master cylinder. Driver comfort is thus improved, because the driver has the impression of immediate braking.

Thereafter, the system enters the actual braking phase.

In a system such as this it is found that there is a peak load that has to be applied to the pedal when the key 84 has covered the travel C and comes into contact with the front end of the slots 88 of the sleeve 54. The object of the invention is to attenuate this transition which is perceivable at the brake pedal.

One subject of the invention is therefore a brake booster comprising:

- a casing of longitudinal axis,
- a skirt and pneumatic piston assembly mounted such that it can slide in a sealed manner in the casing along the longitudinal axis, said skirt-piston assembly dividing the interior space of the casing into a low-pressure front chamber and a variable-pressure rear chamber,
- a three-way valve actuated by a control rod mounted in a longitudinal passage pierced in the pneumatic piston, said control rod being connected via a first longitudinal end to a brake pedal,
- a slide valve plunger able to move, in said piston, along said longitudinal axis under the control of a second end of said control rod, said slide valve plunger allowing the force of the control rod to be applied to a hydraulic piston of a master cylinder, said skirt-piston assembly transmitting a pneumatic boost force to the hydraulic piston of the master cylinder,
- a sleeve mounted such that it can slide in a sealed manner in the pneumatic piston along said longitudinal axis over a determined travel.

The three-way valve comprises a first and a second valve seat, and a valve shutter intended to be pressed against the first and/or the second valve seat. The first valve seat is borne by a first longitudinal end of the sleeve. The second valve seat is borne by a first longitudinal end of the slide valve plunger.

According to the invention, the booster also comprises:

- an elastic device bearing, on the one hand, against a front face of the piston and, on the other hand, against a shoulder of the sleeve. This elastic device tends to exert a forward force on the sleeve relative to the piston,
- a device for transmitting the pressure of the master cylinder to the sleeve which tends to apply a rearward force to the sleeve.

Provision will advantageously be made for the elastic device to comprise a first spring.

According to one preferred embodiment of the invention, the device for transmitting the pressure of the master cylinder comprises an auxiliary piston coaxial with the primary piston of the master cylinder. This auxiliary piston is intended to apply a force to the sleeve via the device that transmits the pressure of the master cylinder. Advantageously, this transmission device comprises a second spring.

According to this embodiment, provision may be made for the second spring to be contained between a first washer that bears against a shoulder of the auxiliary piston and a second washer that bears against a front shoulder of the sleeve.

Furthermore, according to the invention, means are provided for limiting the movement of the sleeve with respect to the pneumatic piston. In this context, the pneumatic piston may then comprise an end-stop shoulder and the sleeve may comprise a travel-limiting component intended to butt against said end-stop shoulder in order to limit the travel of the sleeve inside the piston of the booster.

Provision may also be made for the position of the travel-limiting component on the sleeve to be axially adjustable.

Furthermore, there may also be a bearing piece which bears against the casing of the booster and which has a first part that penetrates an opening in the pneumatic piston and against which this piston is intended to bear, and a second part which enters an opening in the sleeve and which is intended to limit the forward movement of the sleeve when the booster is at rest.

Advantageously, the load of the first spring is lower than the load of the second spring.

BRIEF DESCRIPTION OF THE DRAWINGS

The various objects and features of the invention will become more clearly apparent in the description which will follow and in the attached figures which depict.

One exemplary embodiment of the device of the invention will therefore be described with reference to FIGS. 3 and 4.

DETAILED DESCRIPTION

Figure 1:
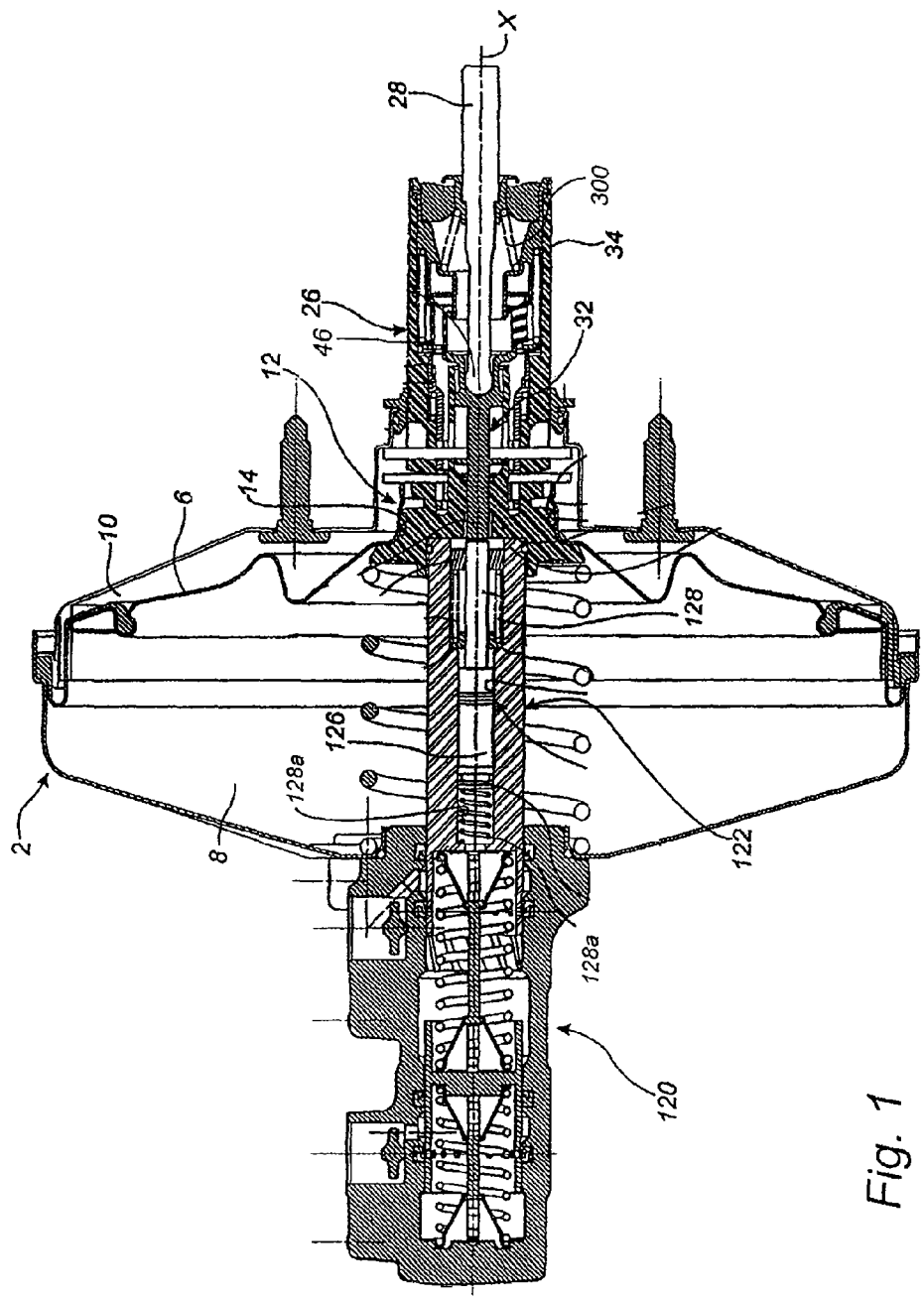
FIG. 1: a brake booster of the type known in the prior art and already described previously.
Figure 2:
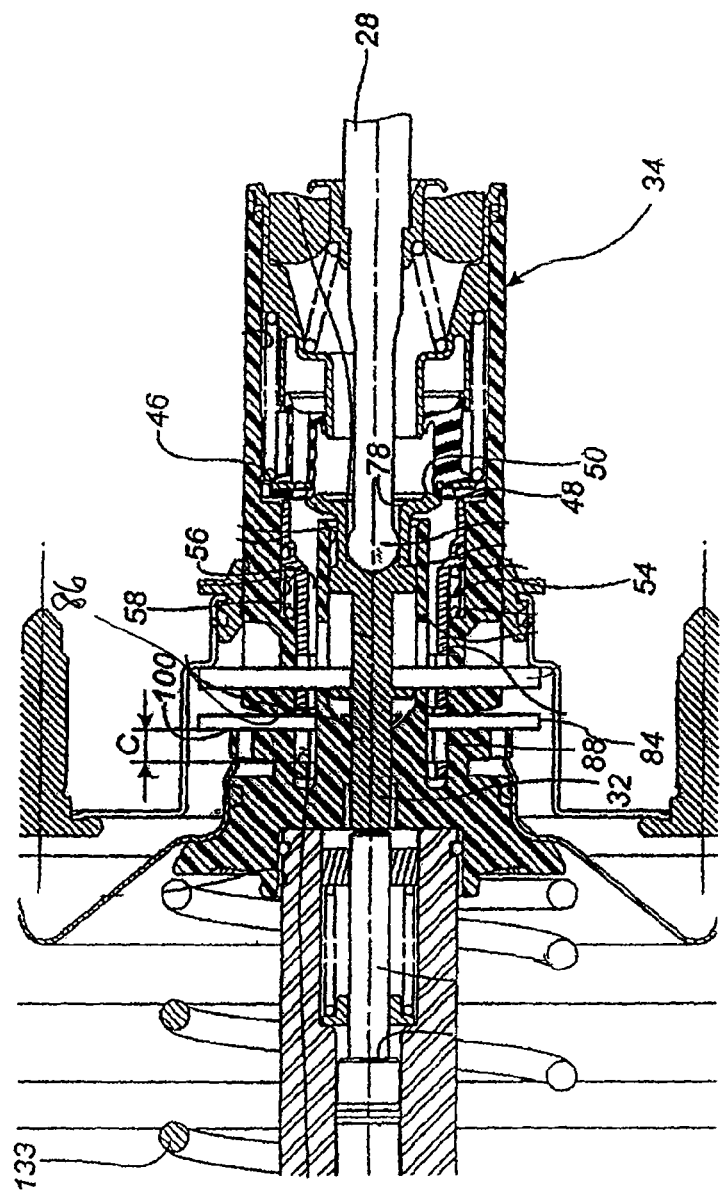
FIG. 2: a more detailed view of the brake booster of FIG. 1, also described previously.

This device applies to a brake booster like that of FIG. 1. In these FIG. 3, only that part of the booster to which the device of the invention relates has been depicted. The components depicted in FIGS. 3 and 4 bear the same references as those components of FIGS. 1 and 2 that perform the same functions.

Figure 3:
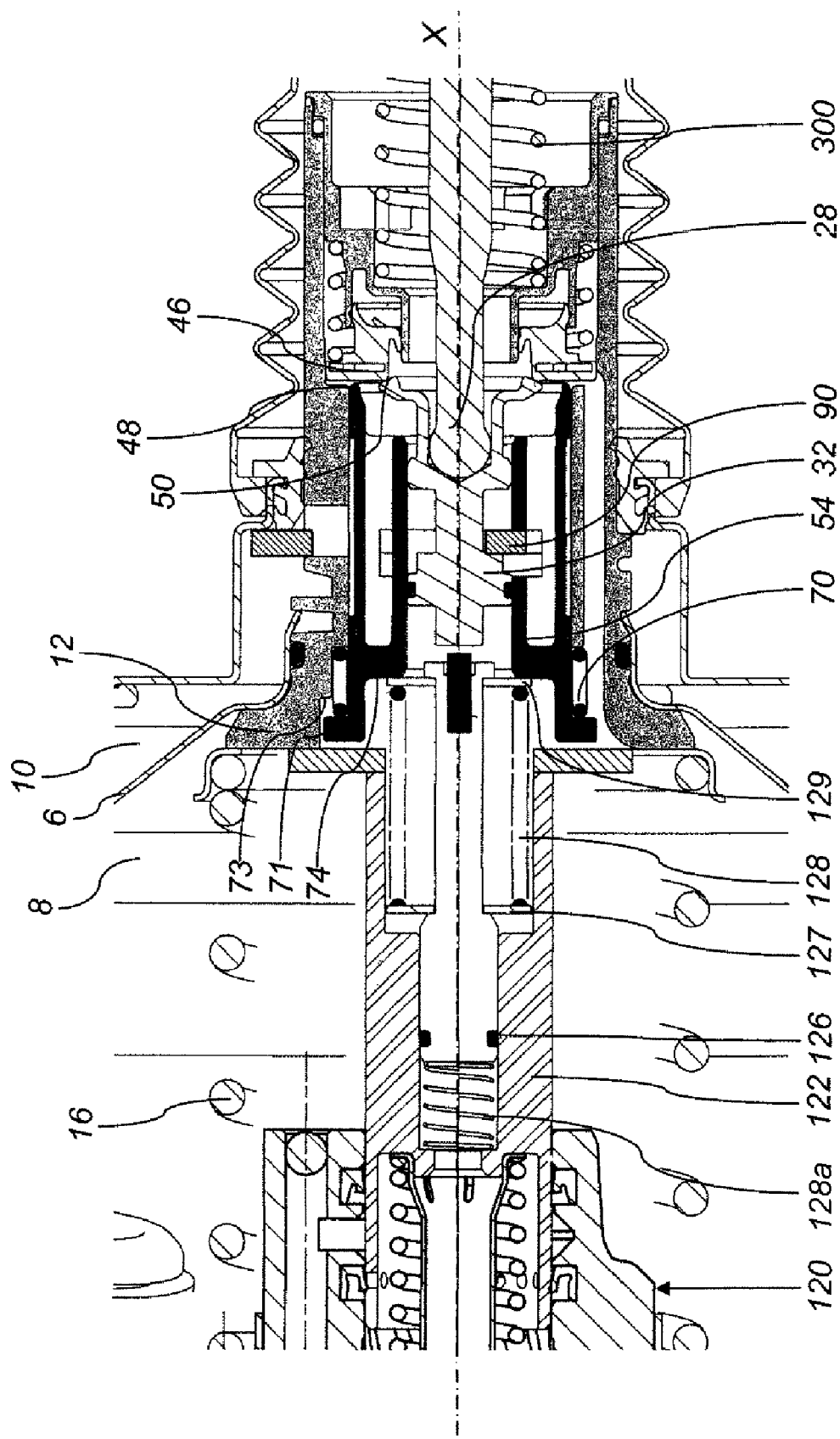
FIG. 3: one exemplary embodiment of the device according to the invention as applied to a pneumatic brake booster.
Figure 4:
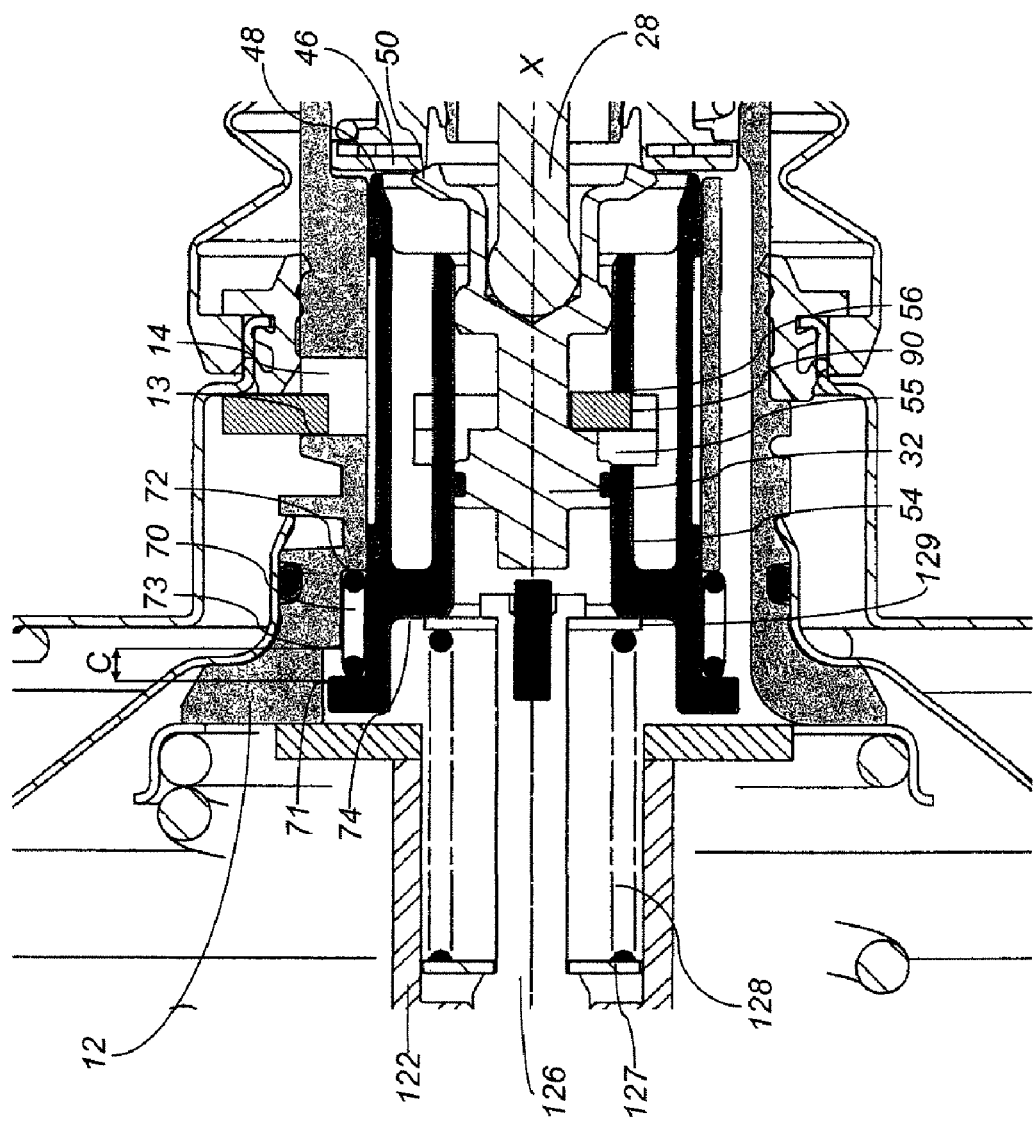
FIG. 4: an enlarged view of the device according to the invention in FIG. 3, FIG. 5: an alternative form of embodiment of the device of FIG. 4.
Figure 5:
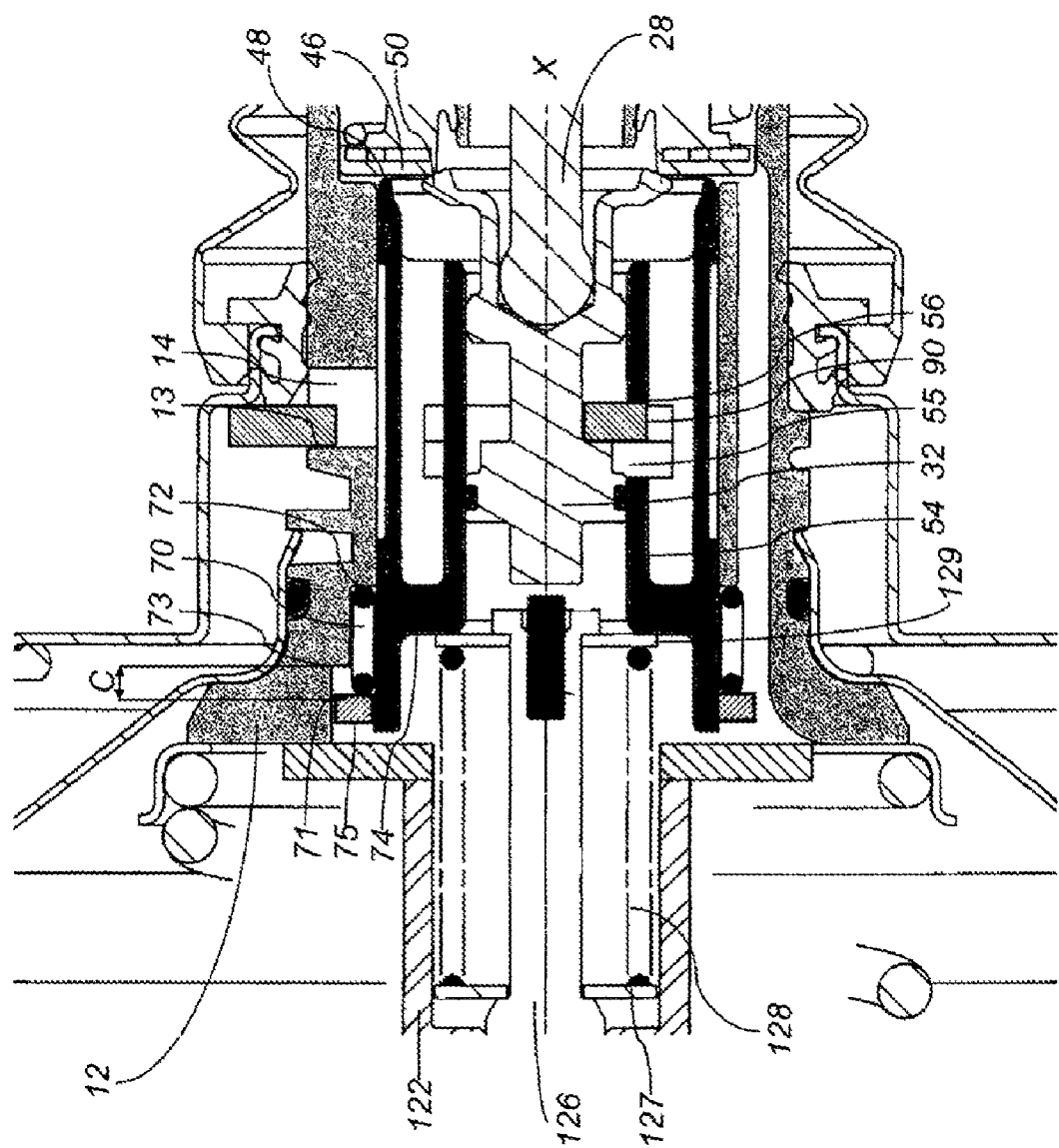

The description of the device of FIGS. 3 and 4 will therefore be given in conjunction with the brake booster embodiment of FIG. 1.

FIG. 3 therefore partially depicts the casing of the booster in which a skirt 6 delimits a (low pressure) front chamber 8 and a rear chamber 10 that can be placed either at the same pressure as the front chamber or at atmospheric pressure.

A pneumatic piston 12 is secured to the skirt and slides along the axis X of the booster.

A sleeve 54 slides axially inside the piston 12.

A slide valve plunger 32 slides axially inside the sleeve under the control of a control rod 28 controlled by a brake pedal, not depicted.

Furthermore, a three-way valve situated inside the piston 12 could be used either to place the first chamber 8 and the rear chamber 10 in communication, or to place the rear chamber at atmospheric pressure, or to isolate the rear chamber. To do that, as is best visible in FIG. 4, the three-way valve comprises a valve shutter 46 of annular shape capable of being in contact either with an equalizing valve seat 48 borne by an annular end of the sleeve 54 or with an intake valve seat 50 borne by an annular end of the slide valve plunger 32.

According to the invention, the sleeve 54 is normally pushed forward (to the left in FIGS. 3 and 4) by a spring 70.

The spring 70 bears, at one end, against the rear face of a shoulder 71 situated at the front of the sleeve 54 and, at another end, against the front face 72 of a shoulder of the piston 12. The spring 70 therefore tends to push the sleeve 54 forward (to the left in the figures) so that the valve seat 48 tends to move away from the valve shutter 46.

Moreover, the auxiliary piston 126 is capable of exerting a rearward force on the sleeve 54. This force is applied via an elastic device comprising, for example, a spring 128a contained between the pistons 122 and 126.

In addition, a stop piece 90 presses against the internal wall of the casing of the booster. It allows the piston to prevent the sleeve from moving forward.

The way in which the device of FIGS. 3 and 4 works will now be described.

When the braking system is at rest (that is to say when the driver is not depressing the brake pedal), the system is as depicted in FIGS. 3 and 4.

The spring 133 pushes the pneumatic piston 12 back to the rear (to the right in FIGS. 3 and 4). The face 13 of the opening 14 in the piston presses backward against the piece 90 and presses this piece 90 against the casing. Part of the piece 90 lies in an opening 55 in the sleeve 54. The piece 90 therefore presses backward against the edge 56 of the opening 55 in the sleeve. This sleeve cannot therefore move forward (to the left in FIGS. 3 and 4).

Moreover, the sleeve 54 is pushed forward by the spring 70 and presses the sleeve 54 against the bearing piece 90.

Because the brake pedal is at rest, the control rod 28 is pushed backward, as is known in the art, by the spring 300. The valve seat 50 pushes the valve shutter 46 backward, this valve shutter being lifted off the equalizing valve seat 48 borne by the sleeve 54. This space between the valve shutter 46 and the valve seat 48 places the front chamber 8 in communication with the rear chamber 10. The valve shutter 46 bears against the intake valve seat 50 and thus isolates the rear chamber 10 from atmospheric pressure.

At the start of a braking phase, when the driver is depressing the brake pedal, the control rod 28 is moved axially forward (to the left in the figures) and the slide valve plunger 32 moves forward. The valve seat 50 moves forward. The valve shutter 46 also moves forward and is pressed against the equalizing valve seat 48 borne by the sleeve 54. The rear chamber 10 is isolated from the front chamber 8. As the slide valve plunger moves forward, the intake valve seat 50 lifts away from the valve shutter 46, allowing air at atmospheric pressure to be supplied to the rear chamber 10.

Because of the difference in pressure between the front chamber and the rear chamber, the skirt 6 and the piston 12 are moved forward.

The piston 12 pushes the piston 122 of the master cylinder 120 forward. The pressure in the master cylinder increases. However, the pressure in the master cylinder tends to push the auxiliary piston 126 back. The piston 126 presses backward against the face 74 of the sleeve 54 via the washer 127, the spring 128 and the washer 129.

Provision will advantageously be made for the load of the spring 70 to be lower than that of the spring 128.

As the piston 12 gradually moves forward, the pressure in the master cylinder 120 increases and the rearward movement of the sleeve 54 with respect to the piston increases. The valve seat 48 moves closer to the valve shutter 46.

As the pressure in the master cylinder gradually increases, there will therefore be an increase in the decoupling of the pedal. This process continues until the face 71 of the sleeve has covered the distance C (see FIG. 4) that separates it from the shoulder 72 of the piston. When the face 71 comes into contact with the shoulder 73, the sleeve meets the piston and moves forward as one therewith.

The valve shutter 46 comes into contact with the intake valve seat 50 and interrupts the supply of air at atmospheric pressure to the rear chamber. The driver then has to depress the brake pedal further in order to increase the intensity of braking.

The valve shutter 46 is then in contact with the equalizing valve seat 48 of the sleeve 54 and with the intake valve seat 50, thus interrupting the supply of air at atmospheric pressure to the rear chamber.

The travel C (see FIG. 4) represented by the distance covered by the face 71 of the sleeve will preferably be chosen such that it corresponds to the dead travel of the master cylinder, that is to say to the travel that the hydraulic piston needs to cover within the master cylinder in order to achieve the onset of the increase in brake fluid pressure in the brakes.

When this is achieved, not only does the driver feel through the pedal only the travel needed to close the equalizing valve and open the intake valve, without perceiving the dead travel of the master cylinder, but also, the transition between this operation and actual braking occurs progressively.

As a result, when the driver releases the brake pedal at least in part, the slide valve plunger 32 is carried backward with the control rod. The intake valve seat 50 comes into contact with the valve shutter 46 and carries the valve shutter 46 away from the equalizing seat 48, thus placing the front chamber 8 in communication with the rear chamber 10. The pressures across the skirt 6 can then equalize, so the skirt 6 returns to the rest position.

As has already been mentioned, the load of the spring 128 is preferably higher than that of the spring 70.

The travel C of the sleeve 54 in the piston has to be adjusted carefully. This is why, according to one alternative form of embodiment of the invention, a travel limiting piece 75 may be provided, this bearing the bearing face 71 for the spring 70. The position of this piece 75 is axially adjustable on the sleeve 54.

The invention claimed is:

1. Brake booster comprising:
   a casing (2) of longitudinal axis (X),
   a skirt (6) and pneumatic piston (12) assembly mounted such that it can slide in a sealed manner in the casing (2) along the longitudinal axis (X), said skirt-piston assembly (6,12) dividing the interior space (4) of the casing (2) into a low-pressure front chamber (8) and a variable-pressure rear chamber (10),
   a three-way valve (26) actuated by a control rod (28) mounted in a longitudinal passage (34) pierced in the pneumatic piston (12), said control rod (28) being connected via a first longitudinal end to a brake pedal,
   a slide valve plunger (32) able to move, in said piston, along said longitudinal axis (X) under the control of a second end of said control rod (28), said slide valve plunger (32) allowing the force of the control rod (28) to be applied to a hydraulic piston (122) of a master cylinder, said skirt-piston assembly (6,12) transmitting a pneumatic boost force to the hydraulic piston (122) of the master cylinder,
   a sleeve (54) mounted such that it can slide in a sealed manner in the pneumatic piston (12) along said longitudinal axis (X) over a determined travel (C), said three-way valve (26) comprising a first (48) and a second (50) valve seat, and a valve shutter (46) intended to be pressed against the first and/or the second valve seat (48,50), said second valve seat (50) being borne by a first longitudinal end of the slide valve plunger (32), the first valve seat being borne by a first longitudinal end of said sleeve (54), characterized in that it also comprises:
   an elastic device (70) bearing, on the one hand, against a front face (72) of the piston (12) and, on the other hand, against a shoulder (71) of the sleeve (54) and having a tendency to apply a forward force on the sleeve relative to the piston,
   a device for transmitting the pressure of the master cylinder (120) to the sleeve (54) and tending to apply a rearward force to the sleeve (54).

2. Brake booster according to claim 1, characterized in that the device for transmitting the pressure of the master cylinder (120) comprises an auxiliary piston (126) coaxial with the primary piston (122) of the master cylinder.

3. Brake booster according to claim 2, characterized in that the elastic device comprises a first compression spring (70).

4. Brake booster according to claim 3, characterized in that the device for transmitting the pressure of the master cylinder comprises a second spring (128).

5. Brake booster according to claim 4, characterized in that the load of the first spring (70) is lower than the load of the second spring (128).

6. Brake booster according to claim 1, characterized in that the pneumatic piston (12) comprises an end-stop shoulder (73) and in that the sleeve (54) comprises a travel-limiting component (71, 75) intended to butt against said end-stop shoulder (73) to limit the movement of the sleeve inside the piston (12) of the booster.

7. Brake booster according to claim 6, characterized in that the distance between the end-stop shoulder (73) and the travel-limiting component (71) corresponds more or less to the dead travel of the master cylinder when the booster is at rest.

8. Brake booster according to claim 6, characterized in that a position of the travel-limiting component (75) on the sleeve (54) is axially adjustable.

9. Brake booster comprising:
   a casing (2) of longitudinal axis (X),
   a skirt (6) and pneumatic piston (12) assembly mounted such that it can slide in a sealed manner in the casing (2) along the longitudinal axis (X), said skirt-piston assembly (6,12) dividing the interior space (4) of the casing (2) into a low-pressure front chamber (8) and a variable-pressure rear chamber (10),
   a three-way valve (26) actuated by a control rod (28) mounted in a longitudinal passage (34) pierced in the pneumatic piston (12), said control rod (28) being connected via a first longitudinal end to a brake pedal,
   a slide valve plunger (32) able to move, in said piston, along said longitudinal axis (X) under the control of a second end of said control rod (28), said slide valve plunger (32) allowing the force of the control rod (28) to be applied to a hydraulic piston (122) of a master cylinder, said skirt-piston assembly (6,12) transmitting a pneumatic boost force to the hydraulic piston (122) of the master cylinder, a sleeve (54) mounted such that it can slide in a sealed manner in the pneumatic piston (12) along said longitudinal axis (X) over a determined travel (C), said three-way valve (26) comprising a first (48) and a second (50) valve seat, and a valve shutter (46) intended to be pressed against the first and/or the second valve seat (48,50), said second valve seat (50) being borne by a first longitudinal end of the slide valve plunger (32), the first valve seat being borne by a first longitudinal end of said sleeve (54), characterized in that it also comprises:

an elastic device (70) bearing, on the one hand, against a front face (72) of the piston (12) and, on the other hand, against a shoulder (71) of the sleeve (54) and having a tendency to apply a forward force on the sleeve relative to the piston, a device for transmitting the pressure of the master cylinder (120) to the sleeve (54) and tending to apply a rearward force to the sleeve (54);

characterized in that the device for transmitting the pressure of the master cylinder (120) comprises an auxiliary piston (126) coaxial with the primary piston (122) of the master cylinder;

characterized in that the elastic device comprises a first compression spring (70);

characterized in that the device for transmitting the pressure of the master cylinder comprises a second spring (128); and characterized in that the second spring (128) is contained between a first washer (127) that bears against a shoulder of the auxiliary piston (126) and a second washer (129) that bears against a front shoulder (74) of the sleeve (54).

10. Brake booster according to claim 9, characterized in that the pneumatic piston (12) comprises an end-stop shoulder (73) and in that the sleeve (54) comprises a travel-limiting component (71,75) intended to butt against said end-stop shoulder (73) to limit the movement of the sleeve inside the piston (12) of the booster.

11. Brake booster according to claim 10, characterized in that the distance between the end-stop shoulder (73) and the travel-limiting component (71) corresponds more or less to the dead travel of the master cylinder when the booster is at rest.

12. Brake booster according to claim 11, characterized in that the position of the travel-limiting component (75) on the sleeve (54) is axially adjustable.

13. Brake booster according to claim 10, characterized in that it comprises a bearing piece (90) bearing against the casing of the booster and having a first part that enters an opening (14) in the piston (12) of the booster and against which the piston is intended to press, and a second part which enters an opening (55) in the sleeve (54) and is intended to limit the forward movement of the sleeve when the booster is at rest.

14. Brake booster according to claim 9, characterized in that the load of the first spring (70) is lower than the load of the second spring (128).

15. Brake booster comprising:

a casing (2) of longitudinal axis (X), a skirt (6) and pneumatic piston (12) assembly mounted such that it can slide in a sealed manner in the casing (2) along the longitudinal axis (X), said skirt-piston assembly (6,12) dividing the interior space (4) of the casing (2) into a low-pressure front chamber (8) and a variable-pressure rear chamber (10), a three-way valve (26) actuated by a control rod (28) mounted in a longitudinal passage (34) pierced in the pneumatic piston (12), said control rod (28) being connected via a first longitudinal end to a brake pedal, a slide valve plunger (32) able to move, in said piston, along said longitudinal axis (X) under the control of a second end of said control rod (28), said slide valve plunger (32) allowing the force of the control rod (28) to be applied to a hydraulic piston (122) of a master cylinder, said skirt-piston assembly (6,12) transmitting a pneumatic boost force to the hydraulic piston (122) of the master cylinder, a sleeve (54) mounted such that it can slide in a sealed manner in the pneumatic piston (12) along said longitudinal axis (X) over a determined travel (C), said three-way valve (26) comprising a first (48) and a second (50) valve seat, and a valve shutter (46) intended to be pressed against the first and/or the second valve seat (48,50), said second valve seat (50) being borne by a first longitudinal end of the slide valve plunger (32), the first valve seat being borne by a first longitudinal end of said sleeve (54), characterized in that it also comprises:

an elastic device (70) bearing, on the one hand, against a front face (72) of the piston (12) and, on the other hand, against a shoulder (71) of the sleeve (54) and having a tendency to apply a forward force on the sleeve relative to the piston, a device for transmitting the pressure of the master cylinder (120) to the sleeve (54) and tending to apply a rearward force to the sleeve (54)

characterized in that the device for transmitting the pressure of the master cylinder comprises a spring (128), and in that the spring (128) is contained between a first washer (127) that bears against a shoulder of the auxiliary piston (126) and a second washer (129) that bears against a front shoulder (74) of the sleeve (54).

16. Brake booster according to claim 15, characterized in that the pneumatic piston (12) comprises an end-stop shoulder (73) and in that the sleeve (54) comprises a travel-limiting component (71, 75) intended to butt against said end-stop shoulder (73) to limit the movement of the sleeve inside the piston (12) of the booster.

17. Brake booster according to claim 16, characterized in that the distance between the end-stop shoulder (73) and the travel-limiting component (71) corresponds more or less to the dead travel of the master cylinder when the booster is at rest.

18. Brake booster according to claim 17, characterized in that the position of the travel-limiting component (75) on the sleeve (54) is axially adjustable.

19. Brake booster according to claim 16, characterized in that it comprises a bearing piece (90) bearing against the casing of the booster and having a first part that enters an opening (14) in the piston (12) of the booster and against which the piston is intended to press, and a second part which enters an opening (55) in the sleeve (54) and is intended to limit the forward movement of the sleeve when the booster is at rest.

20. Brake booster according to claim 15, characterized in that the elastic device comprises a compression spring (70), and in that the load of the compression spring (70) is lower than the load of the spring (128).

* * * * *